(12) United States Patent
Grealish et al.

(10) Patent No.: US 9,799,128 B2
(45) Date of Patent: Oct. 24, 2017

(54) INCREMENTAL AUTOMATIC LAYOUT OF GRAPH DIAGRAM

(71) Applicant: Microsoft Technology Licensing, LLC, Redmond, WA (US)

(72) Inventors: Kevin David James Grealish, Seattle, WA (US); Frederick Edward Weber, III, Seattle, WA (US); Yin Kei, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 14/840,730

(22) Filed: Aug. 31, 2015

(65) Prior Publication Data
US 2017/0031870 A1    Feb. 2, 2017

Related U.S. Application Data

(60) Provisional application No. 62/199,171, filed on Jul. 30, 2015.

(51) Int. Cl.
| | |
|---|---|
| *G06T 11/20* | (2006.01) |
| *G06F 17/21* | (2006.01) |
| *G06T 11/60* | (2006.01) |
| *G06F 17/24* | (2006.01) |

(52) U.S. Cl.
CPC .......... *G06T 11/206* (2013.01); *G06F 17/212* (2013.01); *G06F 17/24* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,764,239 A | 6/1998 | Misue | |
| 6,774,899 B1 | 8/2004 | Ryall | |
| 6,847,363 B1 | 1/2005 | Sauvageau | |
| 7,096,454 B2 | 8/2006 | Damm | |

(Continued)

FOREIGN PATENT DOCUMENTS

| | | |
|---|---|---|
| WO | WO2006091119 | 8/2006 |

OTHER PUBLICATIONS

"Second Written Opinion Issued in PCT Application No. PCT/US2016/044600", Mailed Date: Jan. 2, 2017, 6 pages.

(Continued)

*Primary Examiner* — David H Chu
(74) *Attorney, Agent, or Firm* — Workman Nydegger

(57) ABSTRACT

Adding new nodes to a graph diagram. A set of one or more new nodes is identified from a graph to be added to an existing graph diagram. A set of one or more anchor candidate nodes are identified in the graph that are coupled to the nodes in the set of one or more new nodes. One of the nodes in the set of one or more anchor candidate nodes is selected as an anchor node. An automatic graph diagram layout of the anchor node and new nodes that are to be coupled to the anchor node is performed to create a disjoint graph diagram. A spatial offset from the anchor node to each of the new nodes coupled to the anchor node in the disjoint graph diagram is identified. Each of the new nodes is added to the existing graph diagram while maintaining the identified spatial offsets.

20 Claims, 12 Drawing Sheets

(56) References Cited

U.S. PATENT DOCUMENTS

| | | | |
|---|---|---|---|
| 7,477,263 | B2 | 1/2009 | Saillet et al. |
| 8,185,563 | B2 | 5/2012 | Cohen |
| 8,543,944 | B2 | 9/2013 | Dwyer |
| 8,612,892 | B2 | 12/2013 | Danton |
| 8,654,126 | B2 | 2/2014 | Gansner |
| 8,830,254 | B2 | 9/2014 | Noon |
| 8,902,231 | B2 | 12/2014 | Heinkel |
| 9,342,904 | B2 | 5/2016 | Rubin et al. |
| 2003/0018652 | A1 | 1/2003 | Heckerman |
| 2004/0117749 | A1 | 6/2004 | Lalonde et al. |
| 2005/0060647 | A1 | 3/2005 | Doan |
| 2005/0099423 | A1 | 5/2005 | Brauss |
| 2006/0117067 | A1 | 6/2006 | Wright |
| 2006/0190105 | A1* | 8/2006 | Hsu .................. G06F 8/34 700/86 |
| 2006/0235658 | A1 | 10/2006 | Nitta et al. |
| 2007/0089080 | A1 | 4/2007 | Sakuraba |
| 2008/0012859 | A1 | 1/2008 | Saillet |
| 2008/0246769 | A1 | 10/2008 | Milov et al. |
| 2009/0089299 | A1 | 4/2009 | Flynn |
| 2009/0089715 | A1 | 4/2009 | Dickey |
| 2009/0089739 | A1 | 4/2009 | Mollicone |
| 2009/0100084 | A1 | 4/2009 | Jayadevan |
| 2009/0106646 | A1 | 4/2009 | Mollicone |
| 2009/0228786 | A1 | 9/2009 | Danton et al. |
| 2011/0173530 | A1 | 7/2011 | Winternitz |
| 2016/0342406 | A1 | 11/2016 | Ahmed et al. |

OTHER PUBLICATIONS

Nachmanson, Lev "Microsoft Automatic Graph Layout" available at https://en.wikipedia.org/w/index.php?title=Microsoft_Automatic_Graph_Layout&oldid=651998321 at least as early as Mar. 18, 2015, 2 pages.

Bilgin, Arif, et al., "Graphviz-Graph Visualization Software" available at https://en.wikipedia.org/w/index.php?title=Graphviz&oldid=664S02596 at least as early as May 31, 2015, 2 pages.

Schipper, Arne, et al., "Visual Comparison of Graphical Models" in Engineering of Complex Computer Systems, 2009 14th IEEE International Conference, Issue 2-4, Jun. 2-4, 2009, 8 pages.

Sindre, Guttorm, et al., "Onion Graphs: Aesthetics and Layout" published by 1993 IEEE, Issue 93., pp. 287-291.

Unknown, "Guided Tour through uDraw Graph" Universitat Bremen, 2005, available at http://www.informatik.uni-bremen.de/uDrawGraph/en/uDrawGraph/info.html, 6 pages.

International Search Report and Written Opinion cited in PCT Application No. PCT/US2016/044600 mailed Oct. 26, 2016.

"yFiles.NET Developer's Guide", Version 4.4, Feb. 25, 2015.

International Search Report and Written Opinion cited in PCT Application No. PCT/US2016/044601 mailed Oct. 27, 2016.

Office Action dated Jan. 13, 2017 issued in U.S. Appl. No. 14/840,721.

Osawa "An Immersive Programming System: Ougi" Dec. 4-6, 2002, pp. 1-8.

Smith "Programming as an Experience: The Inspiration for Self", 2009, pp. 1-28.

"Second Written Opinion Issued in PCT Application No. PCT/US2016/044601", Mailed date: Jan. 17, 2017, 6 Pages.

International Preliminary Report on Patentability issued in PCT Application No. PCT/US2016/044600 mailed Mar. 27, 2017.

U.S. Appl. No. 14/840,721, Apr. 17, 2017, Notice of Allowance.

\* cited by examiner

INCREMENTAL AUTOMATIC LAYOUT OF GRAPH DIAGRAM

CROSS-REFERENCE TO RELATED APPLICATIONS

This application claims the benefit of and priority to U.S. Provisional Patent Application Ser. No. 62/199,171 filed on Jul. 30, 2015 and entitled "Incremental Automatic Layout of Graph Diagram," which application is expressly incorporated herein by reference in its entirety.

BACKGROUND

Background and Relevant Art

In mathematics and computer science, graphs can be used to model relationships between different objects. The objects are represented as nodes and relationships between the nodes are represented using edges that connect the nodes.

Graphs can be directed graphs or undirected graphs. In directed graphs, the edges have a direction and thus traversing between two nodes is done in a single direction for a single edge. If travel between nodes can be bi-directional, then the nodes are connected by two edges, each with a different direction. For undirected graphs, travel between nodes can be bi-directional for a single edge.

When maintaining a graph diagram, a user will invest a lot of time in getting the layout as they like it. When there are changes made to the underlying graph (additions, deletions, etc.) it is beneficial to preserve the layout work the user has done in the diagram. In particular, preserving the layout work that the user has done helps the user to maintain visual context with respect to the graph. However, in some systems, automatic layout tools can be implemented to add new nodes into a graph to make the added nodes appear well placed in a graph diagram. If automatic layout tools are applied to the graph when adding new nodes graph diagram, drastic layout changes may occur thereby negating the user's time investment and making maintenance of visual context for the user difficult. Thus, for example, if new nodes are added to or removed from a graph, and an automatic layout algorithm is applied to the graph diagram, including the new nodes, all nodes, including previously laid out nodes may be rearranged thus making it difficult for the user to maintain context as nodes may be moved from their original locations. Thus, it can be difficult to implement automatic layout where the existing layout of a graph diagram is preserved and new elements are still positioned well.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a system configured to display graphs. The system includes a new graph creation tool. The new graph creation tool is configured to receive an updated graph. The updated graph includes one or more existing nodes existing in an existing graph diagram from a previous version of the updated graph and one or more new nodes to be added to the existing graph diagram to update the existing graph diagram to reflect the updated graph. The new graph creation tool is further configured to identify, in the updated graph, a set of one or more new nodes added to the existing graph diagram. The new graph creation tool is further configured to identify in the updated graph a set of one or more anchor candidate nodes from among the one or more existing nodes that are coupled to the nodes in the set of one or more new nodes in the updated graph. Each of the anchor candidate nodes is coupled directly, with no intervening nodes, to at least one of the new nodes in the updated graph. The new graph creation tool is further configured to create a new graph from the set of one or more new nodes to be added to the existing graph diagram and the set of one or more anchor candidate nodes but excluding from the new graph existing nodes from the existing graph that are not directly coupled to a new node. The system further includes a layout tool coupled to the new graph creation tool. The layout tool is configured to automatically layout graphs into graph diagrams to create a disjoint graph diagram from the new graph. The system further includes a combiner tool coupled to the layout tool. The combiner tool is configured to select one of the anchor candidate nodes as an anchor node. The combiner tool is further configured to identify a spatial offset from the anchor node to each of the new nodes coupled to the anchor node in the disjoint graph diagram. The combiner tool is further configured to add each of the new nodes to the existing graph diagram to create an updated graph diagram including the new nodes while maintaining the identified spatial offset for the new nodes to the anchor node in the updated graph diagram.

One embodiment illustrated herein includes a method that includes acts for adding new nodes to a graph diagram. The method includes identifying a set of one or more new nodes from a graph to be added to an existing graph diagram. A set of one or more anchor candidate nodes are identified in the graph that are coupled to the nodes in the set of one or more new nodes in the graph. Each of the anchor candidate nodes is coupled directly, with no intervening nodes, to at least one of the new nodes or a previously floating node in a previous version of the graph in the graph. One of the nodes in the set of one or more anchor candidate nodes is selected as an anchor node. An automatic graph diagram layout of the anchor node and new nodes that are to be coupled to the anchor node is performed to create a disjoint graph diagram. A spatial offset from the anchor node to each of the new nodes coupled to the anchor node in the disjoint graph diagram is identified. Each of the new nodes is added to the existing graph diagram while maintaining the identified spatial offsets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
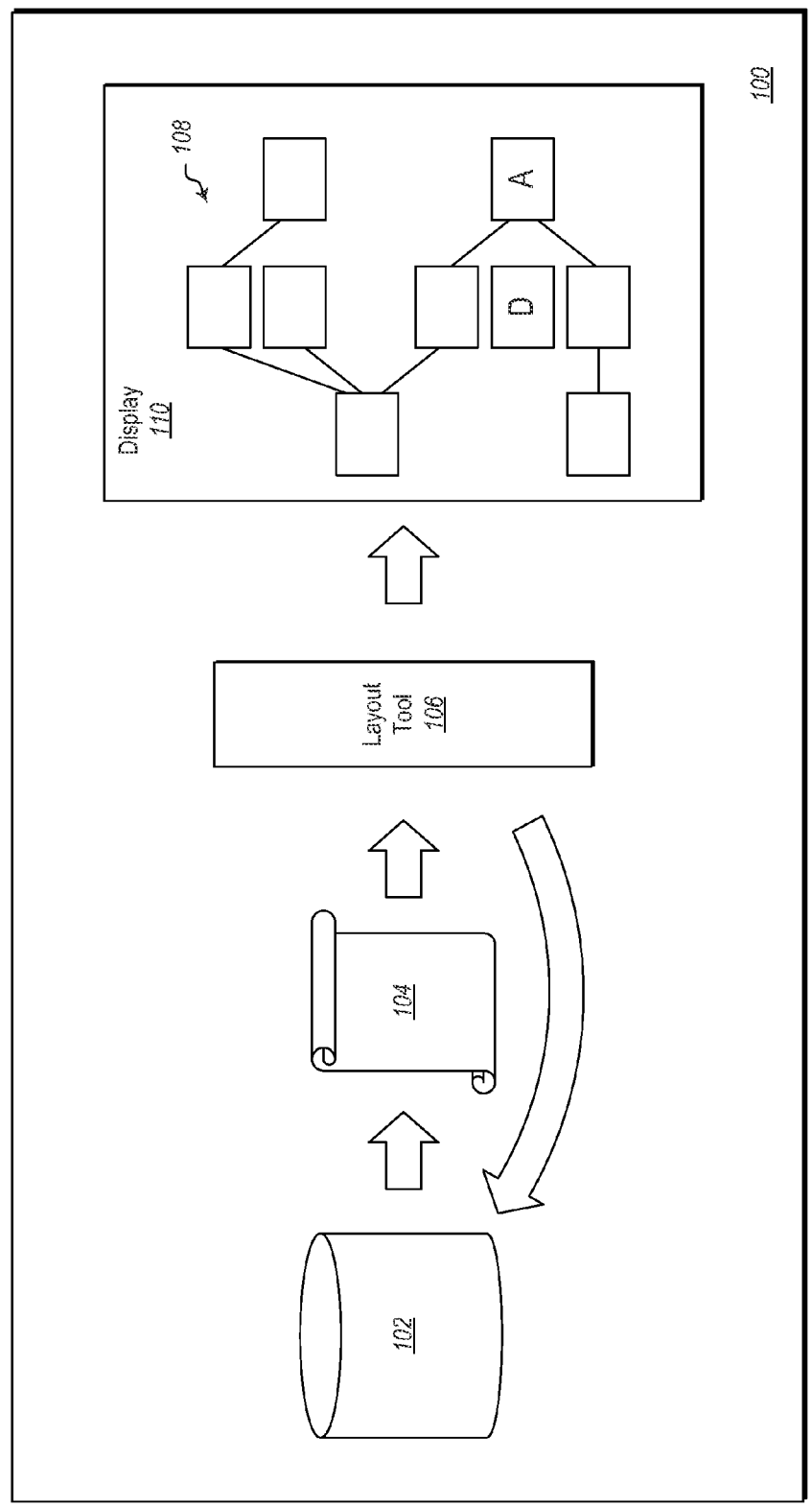
FIG. 1 illustrates a computing system configured to perform a graph layout.

There exist a number of different systems for doing automated layout of complete graph diagrams. Embodiments of the invention can make use of these existing systems to perform automated incremental layout of graph diagrams of one or more new nodes to be added to a graph diagram. Thus, the automated layout is applied to the new nodes without re-laying out existing nodes in the graph diagram. The new nodes can then be added to the graph diagram with the automatic layout being used to position the nodes so that they are well positioned, but without needing to significantly move existing nodes in the graph diagram. This solves a problem related to maintaining visual context of graph diagrams by using automated layout systems to create well placed portions of a new graph diagram and then using layout tools to incrementally add the new graph diagram to an existing graph diagram such that the new graph diagram is added while still maintaining visual context for the previous graph diagram.

In some embodiments, this may be accomplished by performing an incremental layout with an automatic layout tool using new nodes and a single anchor node (where an anchor node is a node previously existing in the graph diagram that is connected, either directly or indirectly, to the new nodes in the graph. Once the incremental layout has been performed on the new nodes and the existing anchor node, so that the layout of the new nodes is a well-placed disjoint graph diagram, the new nodes can be added to the existing graph diagram by positioning the nodes in the existing graph diagram with the same spatial offsets with respect to the anchor node from the disjoint graph diagram preserved in the existing graph diagram. This preserves the layout of existing elements for which the user has invested time and effort.

In another embodiment when the new nodes are not connected to any previously existing nodes in the graph, an automatic layout operation can be performed on the new nodes to create a well laid-out disjoint graph diagram including only the new nodes. A first boundary rectangle around the new disjoint graph diagram is created. This first boundary rectangle is aligned on a first axis with the existing graph diagram. In some embodiments, this may be done by creating a boundary rectangle around the entire existing graph, and aligning edges (e.g., leftmost edges) of the boundary rectangles. That alignment used to create a second boundary rectangle around at least a portion of the existing graph diagram. In particular, a second boundary diagram is created around any nodes that fall at least partially within the width (or length, depending on the axis used for the alignment) of the first boundary diagram when aligned on the first axis with the existing graph diagram. The two boundary rectangles are then aligned on the edges of the rectangles to efficiently lay out the disjoint graph diagram with the existing diagram. This allows for the additional nodes to be efficiently added to the graph diagram while still preserving previous visual context of the graph diagram. As noted, this can be used to provide a system that has an improved user interface that improves the user experience and improves user efficiency when interacting with a graph, rendered in the user interface, which has new elements added to it. The user is able to efficiently interact with a rendering of a graph because visual context is not lost when new elements are added.

Illustrating now additional details, some embodiments may be applied to Azure Data Factory available from Microsoft Corporation of Redmond Wash. In particular, embodiments may be applied to Azure Data Factory's diagrammatic representations of data processing. These diagrams act as maps of data processing for end users. The end users invest in manually arranging their layout and any disruption to this map is disruptive to the end user's ability to reference the diagram as a stable map. When the underlying processing graph changes it is important to the user experience that their layout is preserved. But, it is also important that any new elements are well placed.

As noted previously, a graph is a set of nodes, and a set of edges where each edge connects pairs of the nodes. The edges may have directions making the graph directed) or not. Embodiments of the invention are effective with either directed or undirected graphs, or for any other edge type. The graph may be defined in computer memory or in various computer hardware storage devices using various graph definition languages and/or schemas. For example, FIG. 1 illustrates a computing system 100. The computing system 100 includes a data store 102. The data store 102 stores data defining graphs, including definitions of various nodes and edges in a graph. A graph is typically displayed to a user using a graph diagram.

A graph diagram is a two dimensional diagrammatic representation of a graph where each node has a shape, a size and position on a diagram canvas. FIG. 1 illustrates an example where a graph 104 (illustrated as definition data) can be provided to a layout tool 106. The layout tool 106 can be used to create a graph diagram 108 that can be displayed in a user interface on a display 110. The layout tool 106 may use automatic layout functionality to automatically create the graph diagram 108 and/or make use of manual layout functionality that allows a user to interactively change the graph diagram 108. The layout tool 106 can provide information back to the data store 102 to store information about the graph diagram 108 so that the graph diagram does not need to be re-laid out every time there is a desire to display or operate on the graph diagram 108.

Figure 2:
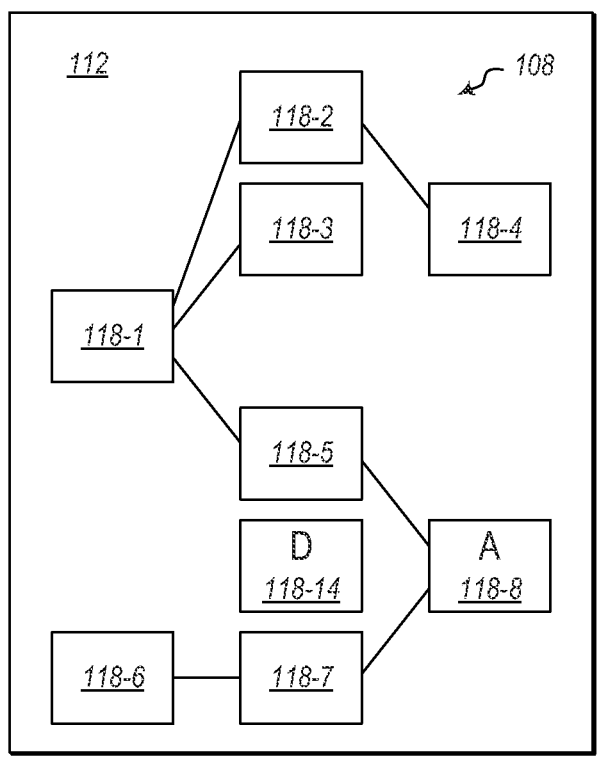
FIG. 2 illustrates a graph layout diagram.

With reference to FIG. 2, a graph diagram 108 for a graph 104 (see FIG. 1) defines the size of nodes for the graph 104, the placement of nodes on a canvas 112, the placement of edges connecting nodes, etc. For example, a node could be defined graphically as a rectangle that is 10 units by 20 units where its top left is at x-coordinate 100 and y-coordinate 200. The units in this example are abstract and the diagram layout is independent of any display or rendering technology. Edges in the graph diagram 108 may be represented as simple straight lines between nodes or could have lore detail such as specified connection points on the nodes or a specified path between the nodes. The paths can be specified by various means, such as a collection of straight line segments, Bézier curves or other representations.

Embodiments can access a graph 104 (mathematically referred to herein as G) and its layout in a graph diagram 108 (mathematically referred to herein as GL), where the graph diagram 108 needs to be updated to reflect changes to the graph 104 since the graph diagram 108 was last updated, including removal and addition of nodes and edges. The graph diagram 108 here could be a diagram of an earlier version of the graph 104, or it could be any partial diagram of the graph 104. Embodiments can update the graph diagram 108, giving the new nodes positions and optionally moving previously disconnected nodes. It can do this making use of an existing full graph automatic layout system. Examples of such systems include graphviz, MSAGL or other automatic layout systems. These will take a graph diagram and layout all nodes and edges.

Figure 3A:
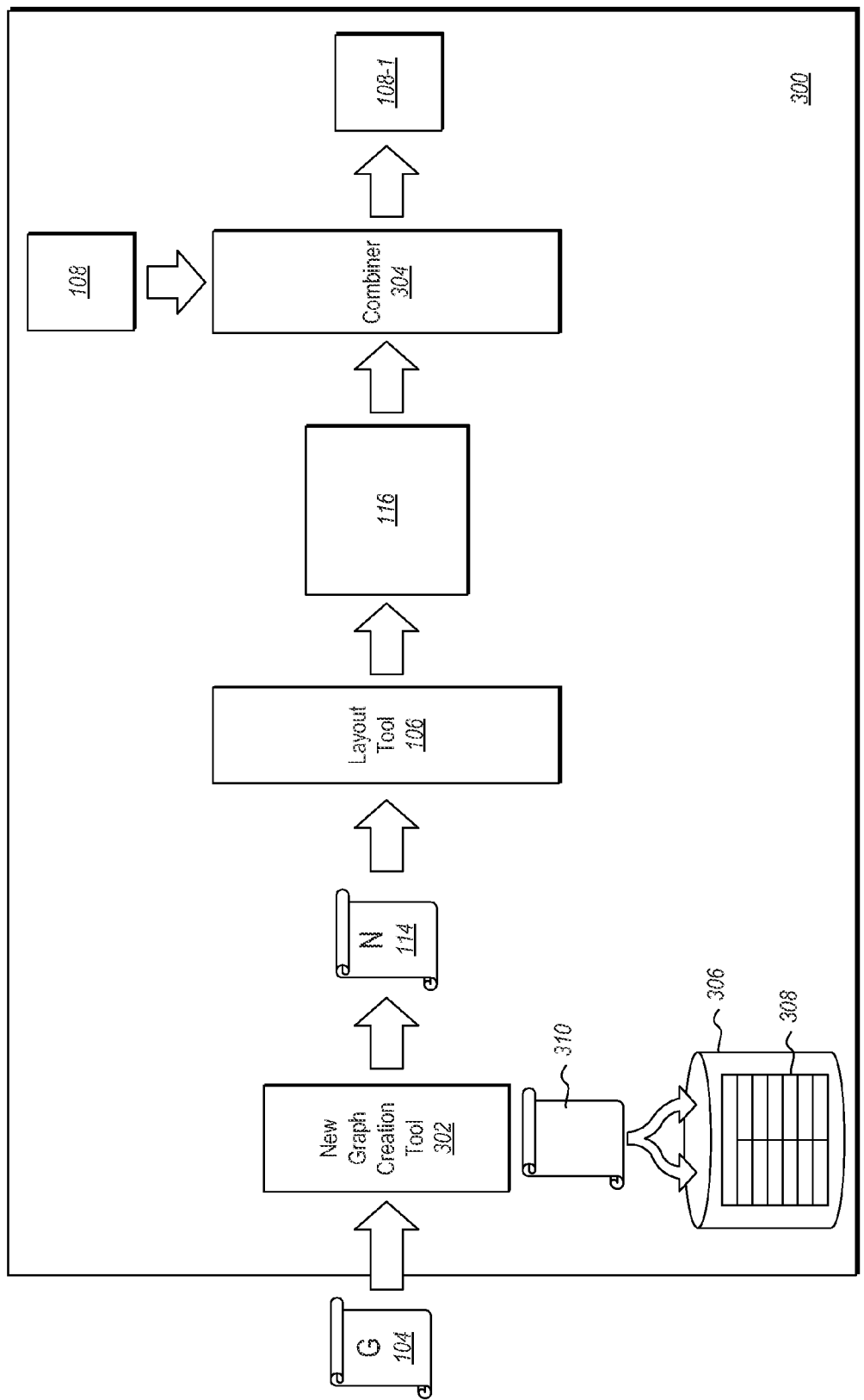
FIG. 3A illustrates a system configured to perform incremental graph layout functionality.

For example, FIG. 3A illustrates an incremental layout engine 300. The incremental layout engine 300 receives as input the graph 104.

The incremental layout engine 300 includes a new graph creation tool 302. The new graph creation tool 302 creates a new graph 114 (referred to herein mathematically as N). The new graph 114 is a subset of the graph 104. In particular, the new graph creation tool 302 is able to identify new nodes in the graph 104. This can be done by comparing the graph 104 with previous versions of the graph 104 to identify the new nodes. Alternatively, the new graph creation tool 302 may be able to consult metadata about the nodes in the graph. This metadata may identify when nodes were created. The new graph creation tool may be configured to identify nodes that were created after some predetermined time as being new nodes. In yet another embodiment, the new node creation tool 302 may be able to compare the nodes from the graph 104 with the graph diagram 108 to identify nodes from the graph 104 that do not appear in the graph diagram 108.

Thus, the new graph 114 includes new nodes. These are nodes that appear in the graph 104, but do not appear in the existing diagram 108.

Figure 5:
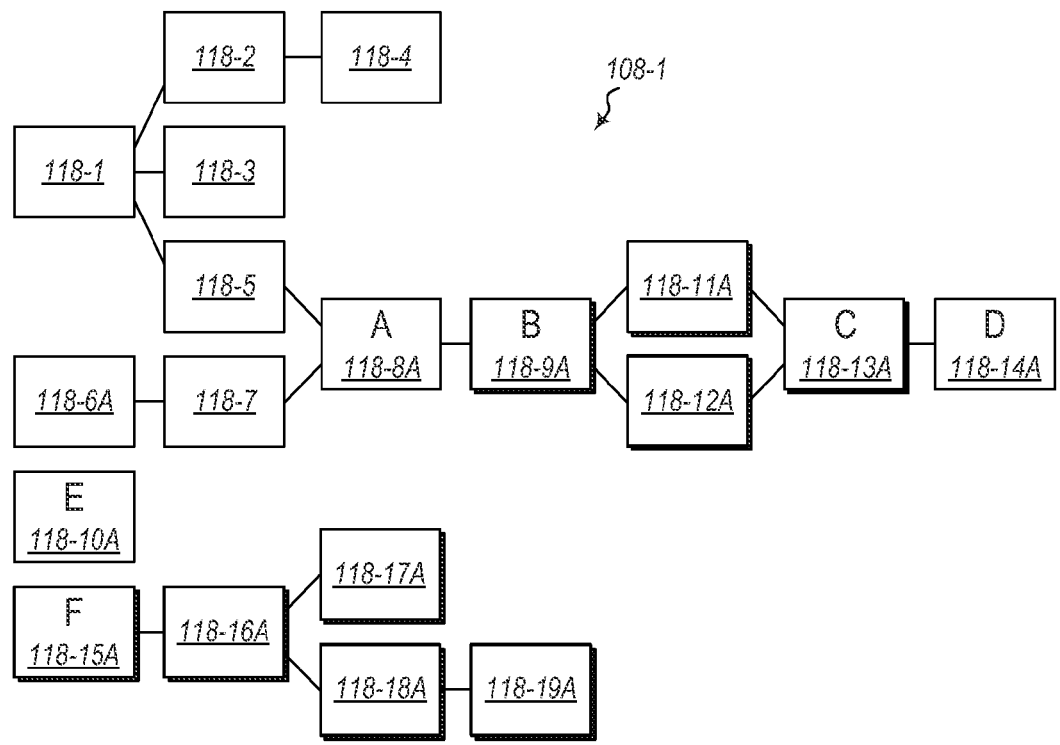
FIG. 5 illustrates adding new layout graph diagrams to an existing graph layout diagram.

The new graph creation tool 302 is further configured to optionally identify nodes in the existing diagram 108 that previously had no connection but that now do in the current version of the graph 104. These nodes can also be included in the new graph 114 created by the new graph creation tool. In the example illustrated herein, the node marked "D" is such a node. These nodes have no edges in the graph diagram 108, but in the current version of the graph 104 they now do. These are referred to herein as floating nodes. Given that floating nodes were not connected to any other node when the graph diagram 108 was made, preserving their position in the updated graph diagram 108-1 (see FIG. 5) is usually not required.

The new graph creation tool 302 is further configured to identify any previously existing nodes from the graph 104 that share an edge with either the new nodes or the floating nodes in the new graph 114 described above. These previously existing nodes are referred to herein as anchor candidate nodes in the discussion below. The new graph creation tool 302 also adds these nodes to the new graph 114.

The new graph 114 includes the edges between any new nodes, floating nodes, and/or anchor nodes in the new graph 114 described above.

Figure 4:
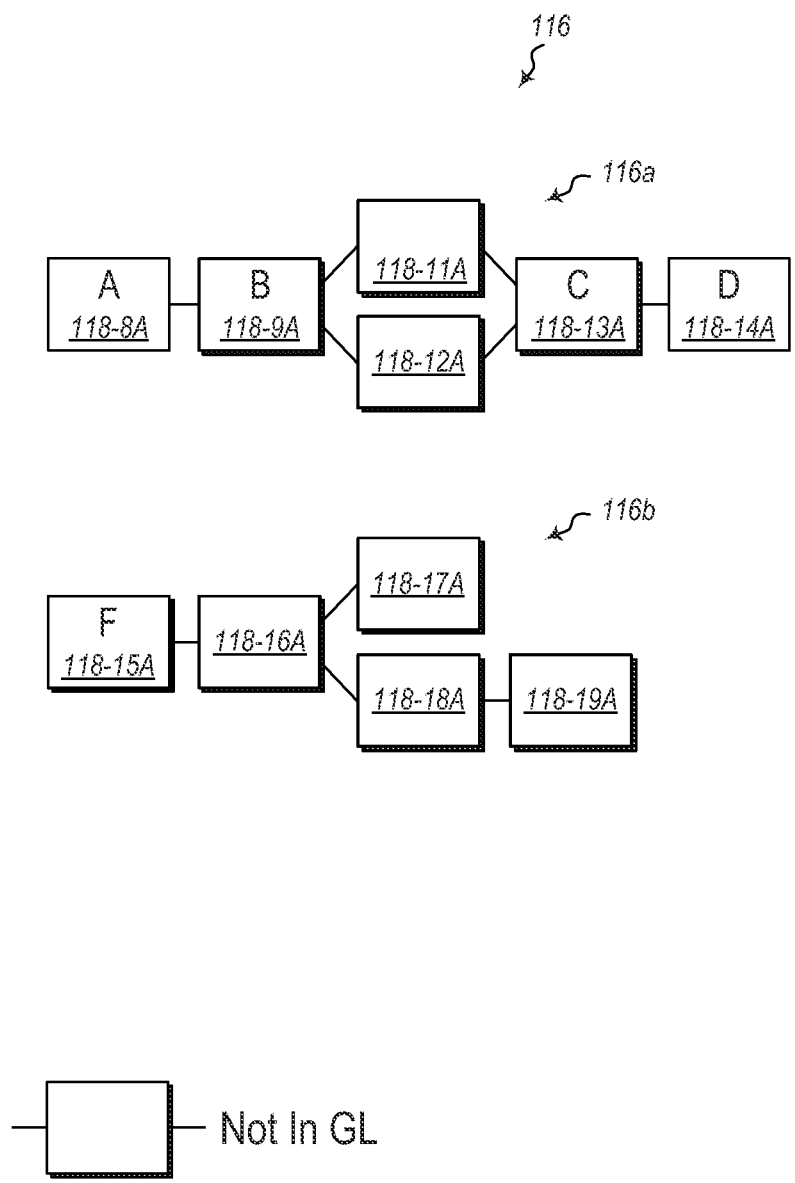
FIG. 4 illustrates new layout graph diagrams.

While it is indicated herein that a given node and/or edge can appear in both graphs 104 and 114, in implementation there may be distinct nodes and/or edges with copied identities and properties where selecting "the same node" in a different graph may be performed by matching on identity. Thus, for example, and with reference to FIG. 6A, the graph 108A may include all of the nodes 118-1 through 118-19 and the connecting edges. Each of these nodes and edges may have distinct identifiers associated with them in the graph definition. The new graph creation tool 302 may create one or more actual new graphs that are distinct from the graph 104. Thus for example, the new graph 114 may be a graph that is distinct from graph 104 with no actual shared elements between the graphs 104 and 114. However, the new graph 114 would have nodes that correspond to the nodes 118-8, 118-9, and 118-11 through 118-19. For example, the new layout graph diagram 116 in FIG. 4 illustrates nodes 118-8A, 118-9A and 118-11A through 118-19A. For example, FIG. 3A illustrates that the incremental layout engine 300 includes a data store 306, which includes correlation data structure 308 which correlates the nodes from the graph 104 with the nodes from the new graph 114. In some embodiments, the new graph creation tool 302 may be configured to provide information 310 to the data store 306 that can be used to create a correlation between nodes. In particular, as the new graph creation tool 302 creates the new graph 114 from the graph 104, it can create the nodes for the new graph 114 based on nodes in the graph 104, and thus provide correlation information to the data store 306.

The incremental layout engine 300 further includes a layout tool 106. The layout tool 106 can perform an automatic layout of the new graph 114. As noted previously, the layout tool 106 may include an existing layout system (for example, graphviz open source software available from graphviz.org or MSAGL available from Microsoft Corporation of Redmond, Wash.) to create a new layout graph diagram 116 (referred to herein mathematically as NL). See FIG. 4 for a detailed view of the new layout graph diagram 116 for the present example.

The new layout graph diagram 116 can be combined with the original layout diagram 108. For example, embodiments can transfer layout information in the new layout graph diagram 116 to the original graph diagram 108. FIG. 3A illustrates a combiner tool 304 that receives as input the new layout graph diagram 116 and the original graph diagram 108. The combiner tool 304 is configured to combine the new layout graph diagram 116 and the original graph diagram 108 to create an updated graph diagram 108-1 (see FIG. 5).

Figure 3B:
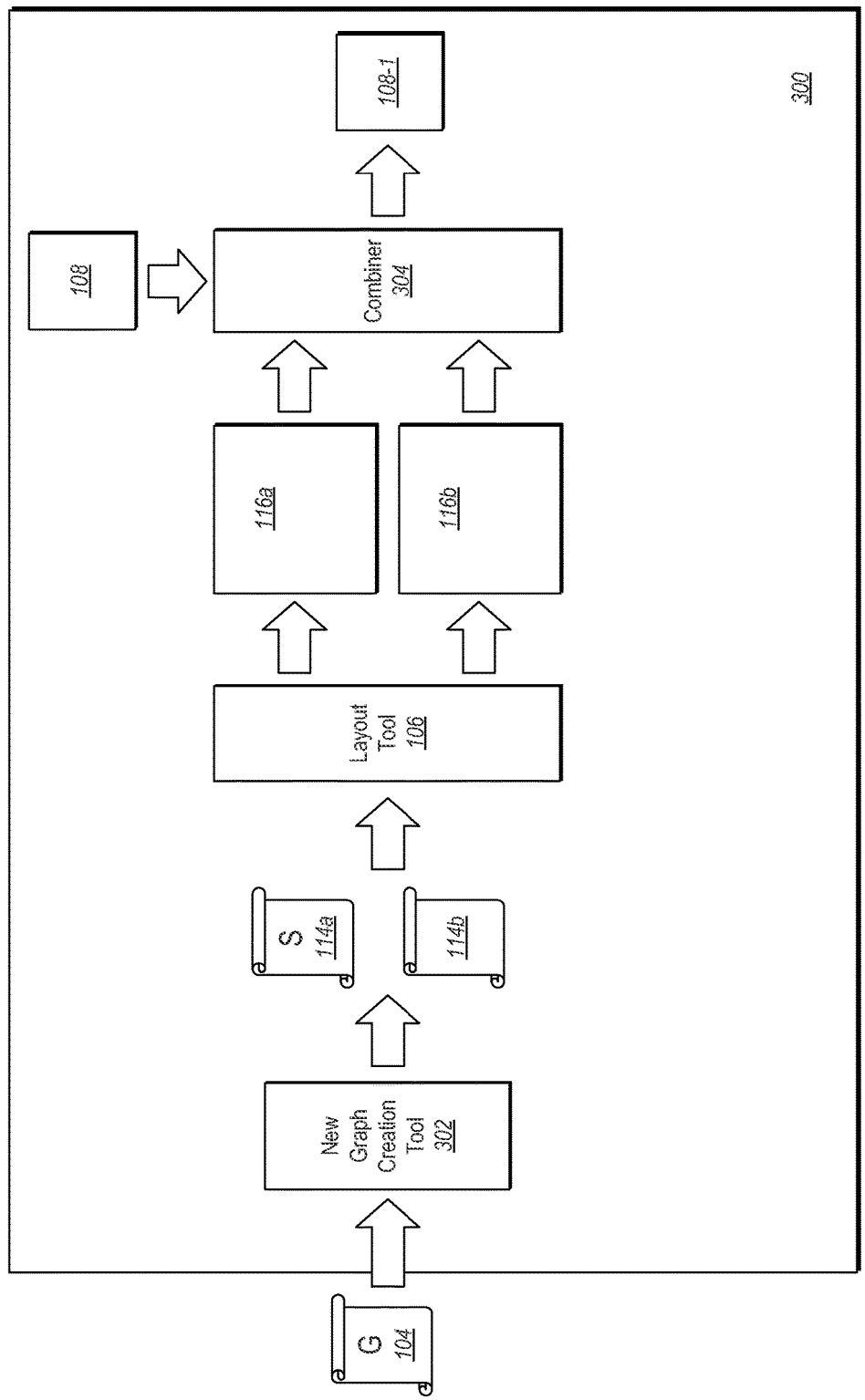
FIG. 3B illustrates another example of the system configured to perform increment graph layout functionality.

In some embodiments, automatic layout of each disconnected subgraph of the new graph 114 (subgaph diagrams 116a and 116b, referred to herein mathematically as NLa and NLb respectively, are illustrated in the present example) could be performed independently. An example of this is illustrated in FIG. 3B. Each of the subgraphs 114a and 114b could be identified by the new graph creation tool 302. In particular, subgraphs would be identified by identifying graphs from the new graph 114 that do not share common nodes. The subgraphs 114a and 114b are provided to the layout tool 106 independent of other subgraphs in the graph 104. Automatically laying out and placing subgraphs independently may give better results in certain situations than laying out the entire new graph 114 depending on the shape of the graph 104.

For each disconnected subgraph (referred to mathematically as S) in the new graph 114, an anchor node (referred to mathematically as A) is selected in S by the combiner tool 304, if it can be. Anchor candidate nodes are non-new nodes (i.e., nodes previously existing in the graph 104 before new nodes were added) that are not floating nodes. Thus, in the illustrated example, the only possible anchor node is node A since node D is a floating node. The method for selection of the anchor node when there is more than one candidate can vary depending on the application. For example, in some embodiments, the right most anchor candidate node based on its position in the original graph diagram 108 is selected. However, various other alternatives may be used. For example, other position decisions may be used by the combiner tool 304 or even random selection of an anchor node from anchor candidate nodes may be used by the combiner tool 304.

In one alternative embodiment, the combiner tool 304 may select different nodes and comparatively determine which node provides some desirable characteristic in the updated graph diagram 108-1. This could be done iteratively or in parallel. As will be explained in more detail below, the anchor node is used as a reference location for determining where to place the new nodes (and potentially previously floating nodes) in the graph diagram. In a comparative anchor node selection scenario, the combiner tool 304 can attempt to add a subgraph diagram 116a to the updated graph diagram 108-1 using different anchor nodes (either iteratively or in parallel) and comparing the different instantiations of the graph diagram 108-1 to determine which instantiation has certain desirable characteristics. For example, such desirable characteristics may include most efficient layout, meaning that graph diagram 1084 takes up the least amount of canvas space. Alternatively a desirable characteristic may be an instantiation of the diagram 108-1 that has the least amount of overlap of new nodes and edges on existing nodes and edges. Etc.

Illustrating now additional details, if the subgraph S (e.g., subgraph 114a) has an anchor node, then for each new or floating node in S (where each new or floating node is referred to as P) will be added to the graph diagram 108 (if not already present) and have its position in the graph diagram 108 set so that the relative position to the anchor A that it has in the new layout is replicated in GL. Specifically, if the x coordinate of A in the graph diagram 108 (i.e., GL) is defined as GL(A).x then:

$GL(P).x=GL(A).x+NL(P).x-NL(A).x$; and $GL(P).y=GL(A).y+NL(P).y-NL(A).y$

In this way, the spatial offset from the anchor node, created as a result of automatic layout of the subgraph S, can be maintained by the combiner tool 304 for new or floating nodes to be added to the graph diagram 108-1.

If no anchor node exists in a subgraph S, then all the edges and nodes of the corresponding subgraph diagram (e.g., subgraph diagram 116b) are transferred into the graph diagram 108-1 by the combiner tool 304, translated to avoid overlap with any other elements in the graph diagram 108-1. There are multiple ways for the combiner tool 304 to select an open area on the canvas 112 (see FIG. 2) into which the subgraph diagram 116b can be translated into.

For example, with reference now to FIG. 6A, the subgraph diagram 116b is efficiently placed by the combiner tool 304 below the elements in the graph diagram 118-A. This is done by the combiner tool 304 creating a bounding rectangle 602 around the subgraph diagram 116b and a bounding rectangle 603 around all elements in the graph diagram 108-A. These two rectangles are aligned by their sides 602-1 and 603-1 along a first axis 608. Once aligned, another bounding rectangle 604 (see FIG. 6B is created around any nodes not in the subgraph diagram 116b and that overlap the width 606 of the bounding rectangle 602 for the subgraph diagram 116b. Thus, the bounding rectangle 604 bounds nodes 118-1 through 118-12 because each of these nodes is at least partially within the width 606 of the bounding rectangle 602. The bounding rectangle 602 is aligned to the left of the bounding rectangle 604. The top of the bounding rectangle 602 is aligned to the bottom of the bounding rectangle 604. This allows the subgraph diagram 116b to be added in a space efficient way into the updated graph diagram 108-1. Note that had node 118-10 been left of node 118-19, the bounding rectangle 604 would have been different and the subgraph diagram 116b could have been moved adjacent nodes 118-6 and 118-7.

Illustrating now additional details for the creation of the bounding rectangle 602, the sides 602-1, 602-2, 602-3 and 602-4 are sized and positioned to include all portions of the nodes 118-15 through 118-19 in the subgraph diagram 116b. The sides 602-1, 602-2, 602-3 and 602-4 may optionally be further sized and positioned to include some predetermined margin between the outermost edges of the outermost nodes in the set of nodes 118-15 through 118-19. The margin may be, for example, user specified, automatically determined based on aesthetic or other rules, or otherwise determined.

Illustrating now additional details for the creation of the bounding rectangle 604, when the bounding rectangles 602 and 604 are to be left aligned, a boundary location along a first axis 608 for a first side 604-1 of the rectangle is determined based on the leftmost location of the leftmost node(s) (i.e., in the present example nodes 118-1, 118-6 and 118-10) from among nodes 118-1 through 118-14. The boundary location for the first side 604-1 may include some predetermined margin between the leftmost edge of the leftmost node(s) and the boundary. The margin may be user specified, automatically determined based on aesthetic or other rules, or otherwise determined. The bounding rectangle 602 has its leftmost side 602-1 aligned to this boundary where the first side 604-1 will be created. The width 606 of the bounding rectangle 602 is applied from the boundary for the first side 604-1 along the first axis 608. All previously placed nodes from the graph diagram 108-1 that have any portion of the node falls within width 606 of the bounding rectangle 602 applied from the boundary for the first side 604-1 along the first axis 608 is identified. In this case, this includes nodes 118-1 through 118-12. The sides 604-1, 604-2 604-3 and 604-4 are then sized and positioned to fully bound these identified nodes. The sides 604-1, 604-2 604-3 and 604-4 may optionally be further sized and positioned to include some predetermined margin between the outermost edges of the outermost nodes in the set of nodes 118-1 through 118-12. The margin may be, for example, user specified, automatically determined based on aesthetic or other rules, or otherwise determined.

Once the bounding rectangles 602 and 604 have been created, and the sides 602-1 and 604-1 have been aligned on the first axis 608, the sides 602-2 and 604-3 can be aligned on the second axis 610. While the alignment along the second axis 610 could be at a given point along the second axis, particularly when margins have already been integrated into the bounding rectangles from the sides to the outermost nodes, such alignment is not required. In some embodiments, the sides 602-2 and 604-3 can be aligned in the second axis with some predetermined offset between the position of the side 602-2 and the side 604-3 along the second axis 610.

While the example illustrated in FIG. 6B shows alignment of the leftmost sides 602-1 and 604-1 along the first axis 608 and alignment of the sides 602-3 and 604-3 along the second axis 610, it should be appreciated that other embodiments may choose other alignments for adding disjoint graphs without anchor nodes to the graph diagram 108-1. For example, the side 602-3 could be aligned with the side 604-2. In this case the subgraph diagram 116b would appear above the nodes in the graph diagram 108-A that are not in the subgraph diagram 116b (i.e., nodes 118-1 through 118-14).

In another example, the bounding rectangle 602 may first be aligned with a boundary along the second axis 610 to facilitate creation of the bounding rectangle 604, and then a second alignment of the sides 602-4 and 604-1 along the first axis 608 may be performed. Of course in this case the bounding rectangle would bound different nodes and be of a different shape than that illustrated in FIG. 6B. This would result in the subgraph diagram 116b being either to the left or to the right of the nodes in the graph diagram 108-A. In other embodiments, the subgraph diagram 116b could be rotated before creating the bounding rectangles in the fashions described above. However, rotation would likely not be performed if the subgraph diagram 116b represented a directed graph due to how directed graphs are traditionally read by a user (i.e., from left to right).

Figure 6A:
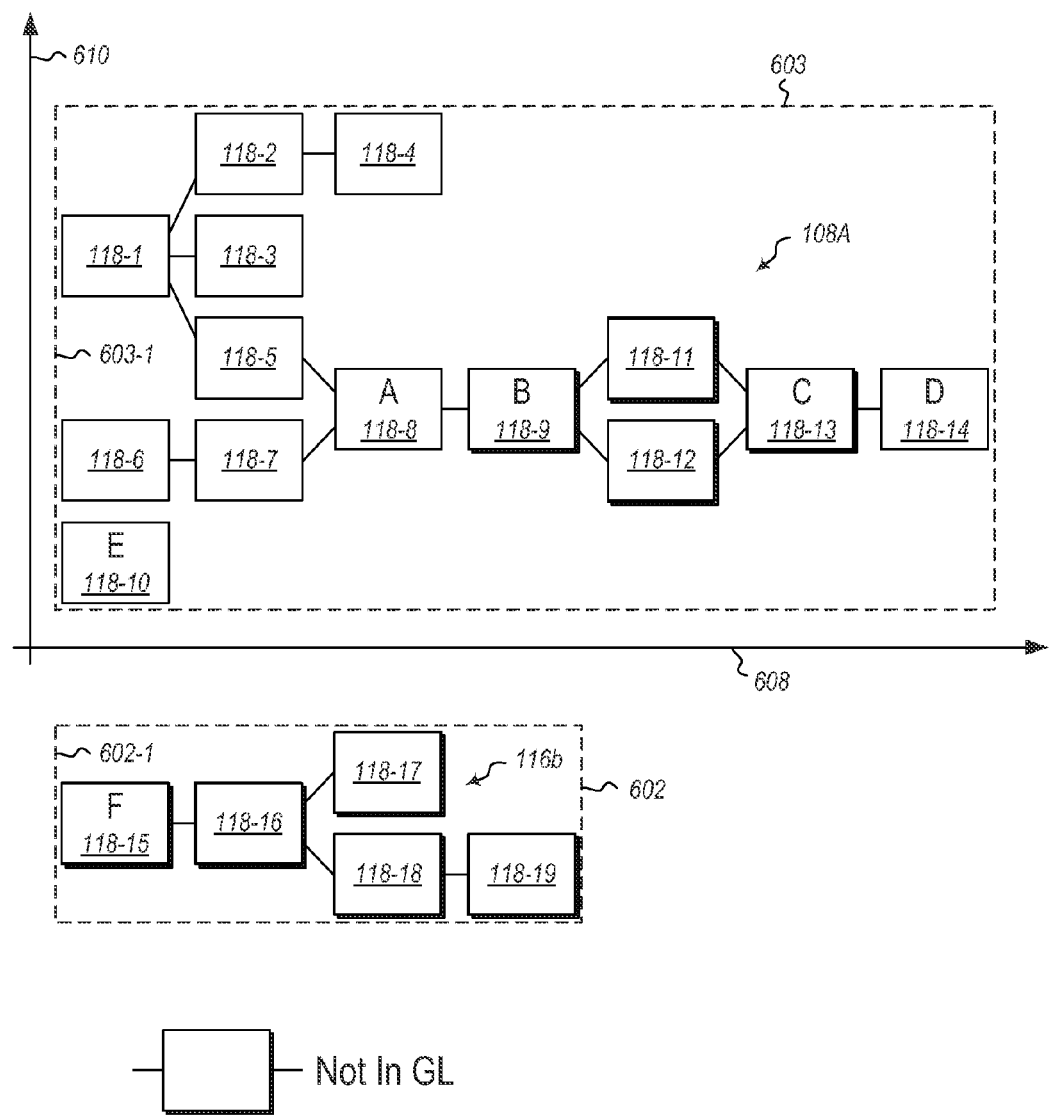
FIG. 6A illustrates portions of a process for adding a new subgraph diagram to an existing layout graph diagram.
Figure 6B:
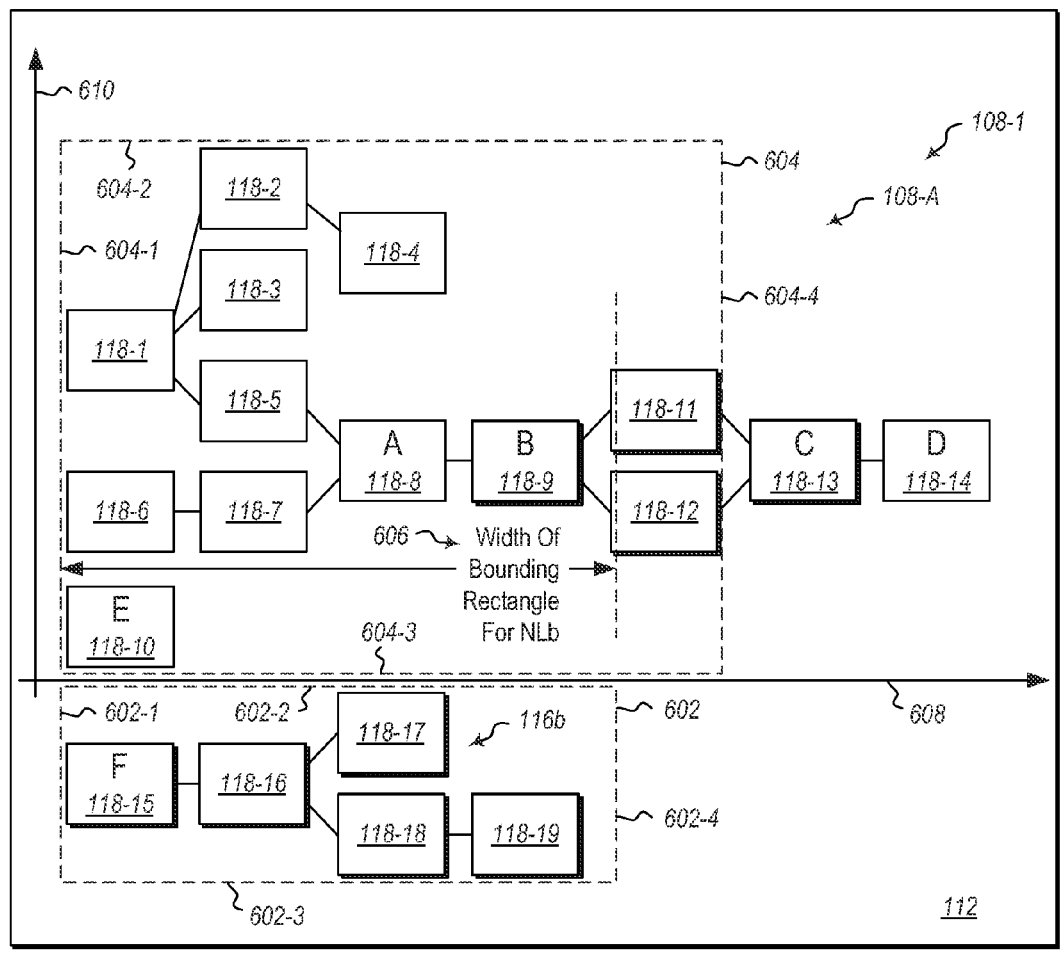
FIG. 6B illustrates additional portions of a process for adding a new subgraph diagram to an existing layout graph diagram.

Notably, the example illustrated in FIGS. 6A and 6B illustrates one method of aligning the graph diagram 108-A with the subgraph diagram 116b on the first axis 608 by using the bounding rectangle 603 and the bounding rectangle 602. However, in other embodiments, the alignment can be done without creating bounding rectangles. For example, embodiments may be implemented where the left-most (or lowest placed on the first axis) item is computed as a boundary in each of the two graphs. Embodiments can then align the subgraph diagram 116 with the graph diagram 108-A by making the boundaries match or by having the boundaries offset from each other. Thus, for example, in FIG. 6A, the left-most position of nodes 118-1, 118-6 or 118-10 and node 118-15 can be used to align the subgraph diagram 116b with the graph diagram 108-A.

Figure 6C:
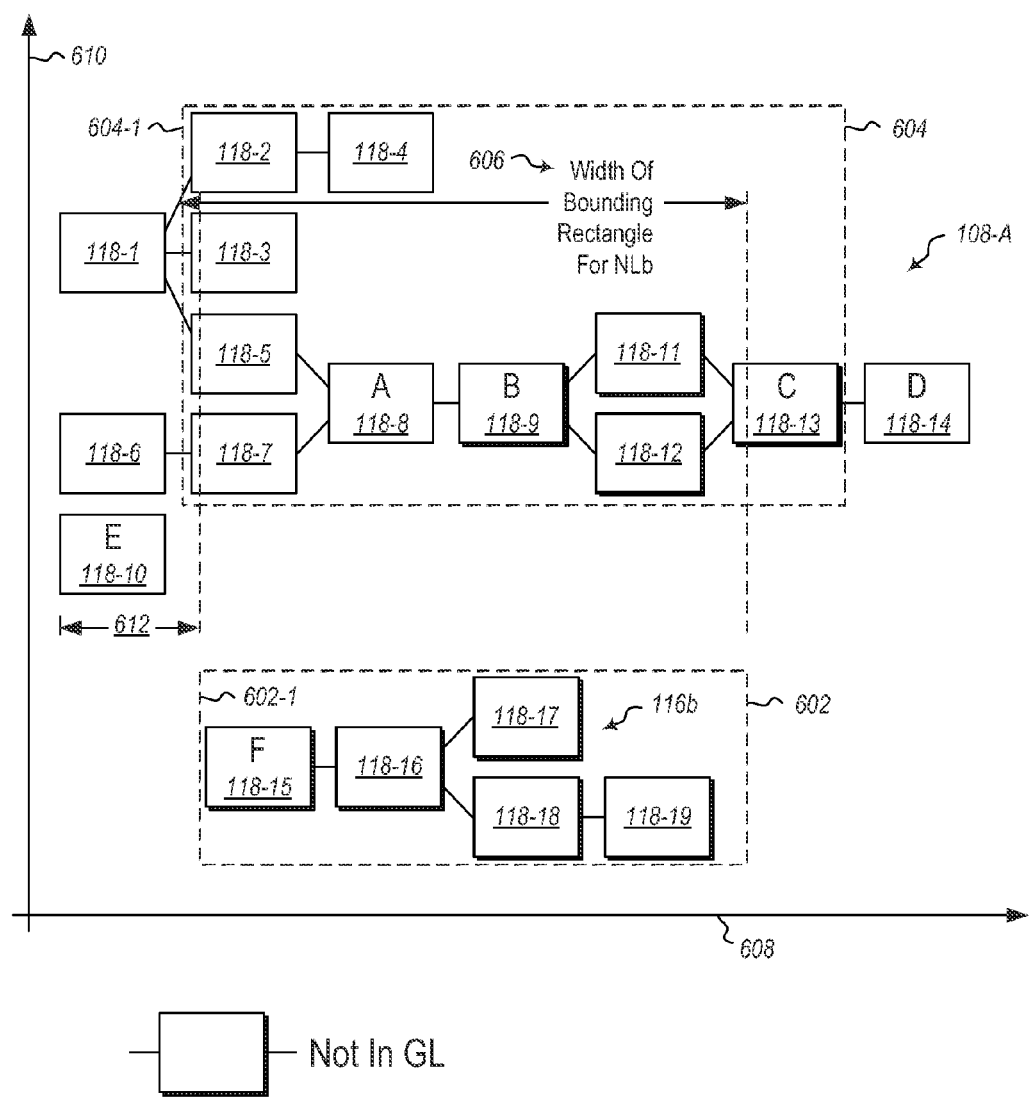
FIG. 6C illustrates portions of an alternative process for adding a new subgraph diagram to an existing layout graph diagram.

In yet another example, as illustrated in FIG. 6C, embodiments may be implemented where the combiner tool 304 (See FIG. 3B) is configured to first align a side of the bounding rectangle 602 (or other boundary for the graph 116b, such as the node 118-15) at a significant rightward offset 612 on the first axis 608 with respect to the leftmost edge of the leftmost node from among the nodes in the graph diagram 108-A. The bounding rectangle 604 is constructed in a fashion similar to that described above in conjunction with the description of FIG. 6B except that it is based on the offset. In particular, as illustrated, the width of the bounding rectangle 602 for NLb 606 from the offset 612 includes nodes 118-2 through 118-5, 118-7 through 118-9, and 118-11 through 118-13, and the bounding rectangle 604 is constructed accordingly. As illustrated in FIG. 6C, the leftmost edge 602-1 is aligned using the offset 612 in the first axis 608 and then the subgraph diagram 116b is translated along the second axis 610 to align side 604-3 with the side 602-2 along the second axis 610. This creates an efficiently and well laid out graph diagram while maintaining previous visual context.

Figure 6D:
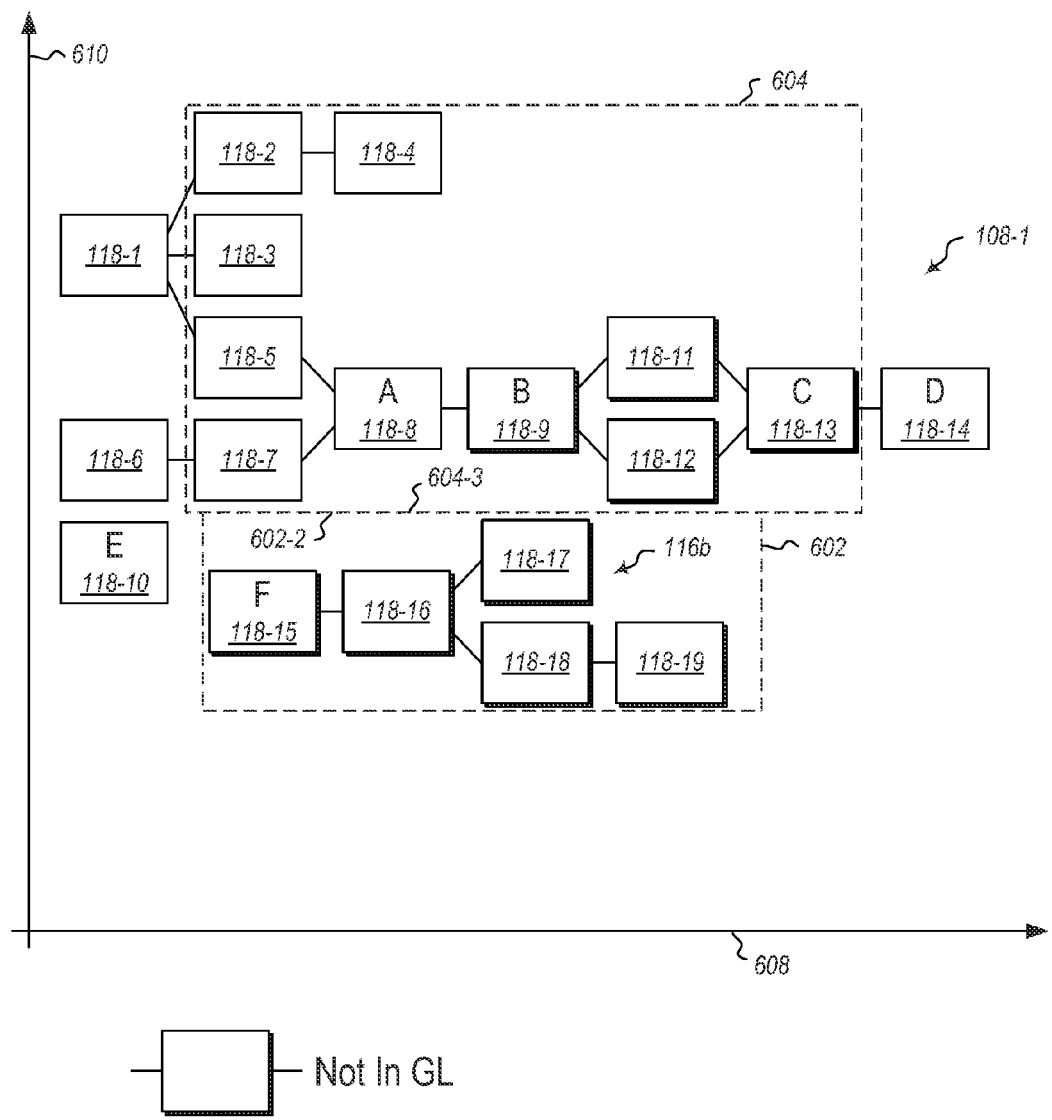
FIG. 6D illustrates additional portions of an alternative process for adding a new subgraph diagram to an existing layout graph diagram.

Note that the process illustrated in FIGS. 6C and 6D can be performed at different offset values with respect to the offset 612 to attempt to identify some type of preferred offset value. For example, embodiments may attempt to identify offsets that result in a final graph diagram that occupies less canvas space than the final graph diagram that would result from other offsets.

When using different offsets, embodiments ma implement various numbers of offset steps for each offset. For example, some embodiments may have offset steps based on an arbitrarily selected fixed distance. Alternatively, embodiments may have offset steps based on sizes of nodes in the graph diagram 108-A or any of the other graph diagrams illustrated. For example, in one embodiment, the offset step may be the average width of all of the nodes in the graph diagram 108-A. Alternatively, the offset step may be the mean width of all of the nodes in the graph diagram 108-A. In yet another set of alternative examples, the offset step may be a fraction of the average or mean width of all of the nodes in the graph diagram 108-A. For example, half of the average or mean width of all of the nodes of the graph diagram 108-A may be selected as an offset step.

Once node positions have been transferred by the combiner tool 304 from the new layout graph diagram 116b to the graph diagram 108-1, the related edges and paths can also be preserved and transferred from the new layout graph diagram 116 to create the graph diagram 108-1. When the relative positions of the edge's nodes are the same in both the new layout graph diagram 116 and the graph diagram 108-1, the paths and connecting points can be preserved (with translation as needed), or they can be reconstructed when the relative positions are changed using just the new positions of nodes in the graph diagram 108-1.

At this point, the updated graph diagram 108-1 may have overlapping nodes. Some automated layout systems will allow a final adjustment to the updated graph diagram 108-1 to move nodes only sufficiently to remove overlapping elements and preserving the layout as much as possible.

Nodes and edges that are in the graph diagram 108-1 and no longer in the graph 104 can simply be removed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
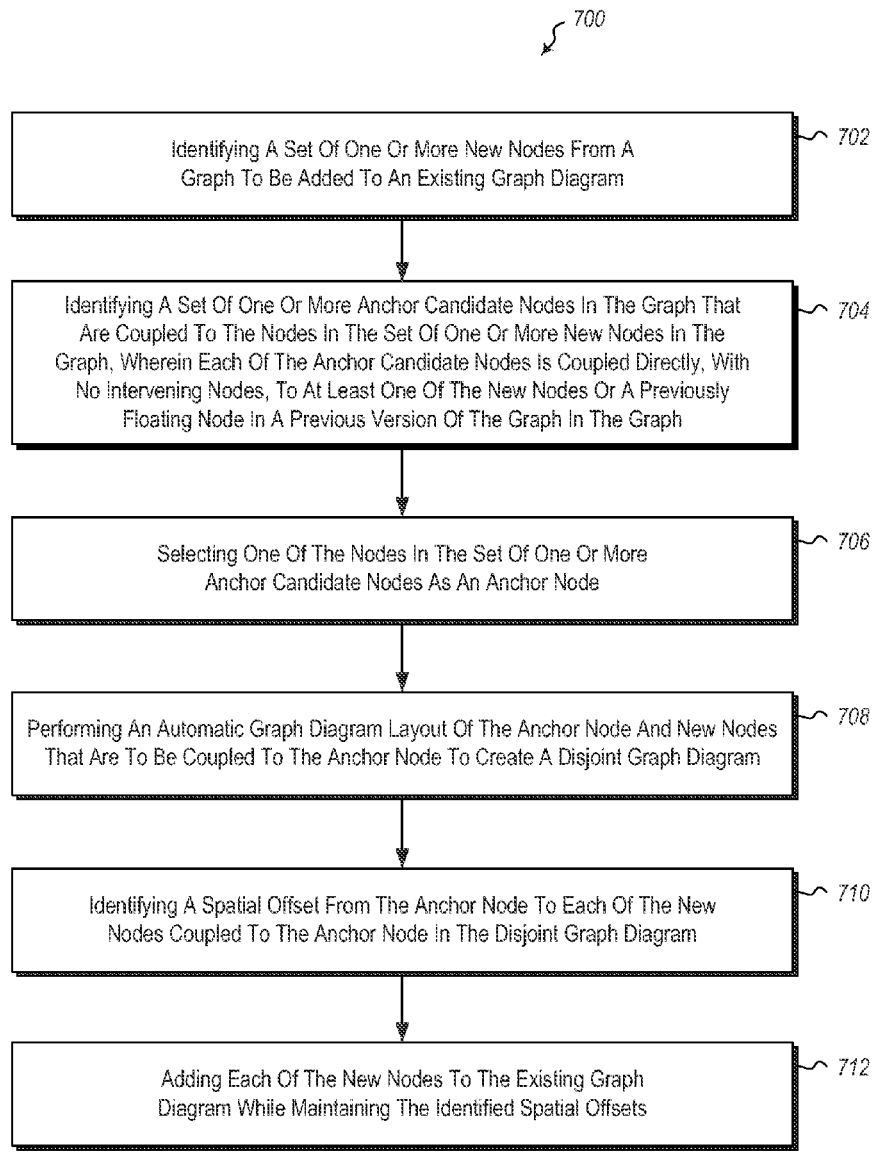
FIG. 7 illustrates a method for adding new nodes to a graph diagram.

Referring now to FIG. 7, a method 700 is illustrated. The method 700 includes acts for adding new nodes to a graph diagram. The method includes identifying a set of one or more new nodes from a graph to be added to an existing graph diagram (act 702). For example, FIG. 3A illustrates that the new graph creation tool 302 identifies new nodes in the graph 104.

The method 700 further includes identifying a set of one or more anchor candidate nodes in the graph that are coupled to the nodes in the set of one or more new nodes in the graph wherein each of the anchor candidate nodes is coupled directly, with no intervening nodes, to at least one of the new nodes or to a floating node from a previous version of the graph in the graph (act 704). For example, FIG. 3A illustrates that the new graph creation tool 302 identifies anchor candidate nodes. Illustratively, in FIG. 5, node A may be an anchor candidate node (and, in fact, is eventually selected as the anchor node) because it is coupled to the set of new nodes including nodes 118-9, 118-11, 118-12, and 118-13, and is coupled directly to new node 118-9. While in FIG. 4, node D is shown coupled to the new nodes, node D is not an anchor candidate node because as illustrated in FIG. 2, node D is a floating node in a previous version of the graph. Floating nodes are not selected as candidate anchor nodes.

The method 700 further includes selecting one of the nodes in the set of one or more anchor candidate nodes in the existing graph as an anchor node (act 706). For example, the new graph creation tool 302 may select a node from the set of anchor candidate nodes as an anchor node.

The method 700 further includes performing an automatic graph diagram layout of the anchor node and new nodes that are to be coupled to the anchor node to create a disjoint graph diagram (act 708). For example, the layout tool 106 may be used to create a disjoint graph diagram, such as the disjoint graph diagram 116a The method 700 further includes identifying a spatial offset from the anchor node to each of the new nodes coupled to the anchor node in the disjoint graph diagram (act 710). For example, the combiner tool 304 (see FIG. 3A) may be configured to calculate the spatial offset of nodes 118-9A, 118-11A, 118-12A, and 118-13A from the anchor node 118-8A (See FIG. 4). Embodiments may also calculate offsets for nodes that were previously floating nodes in previous versions of graphs, such as node 118-14A, from the anchor node.

The method 700 further includes adding each of the new nodes to the existing graph diagram while maintaining the identified spatial offsets (act 712). For example, the combiner tool 304 may add the new nodes from the subgraph diagram 116a to the graph diagram 108 to produce the updated graph diagram 1084 shown in FIG. 5 or the graph diagram 108-A shown in FIG. 6A.

The method 700 may further include performing a remove overlap operation to remove any overlap of added nodes onto existing nodes in the existing graph diagram.

The method 700 may further include performing the acts of claim 1 with different automatic layout functions to identify a layout function that causes the least amount of overlap of new nodes over existing nodes in the existing graph diagram.

The method 700 may further include performing the acts of claim 1 with different automatic layout functions to identify a layout function that causes a most efficient graph layout.

The method 700 may be performed where selecting one of the nodes in the set of one or more anchor candidate nodes in the existing graph as an anchor node comprises selecting a node from the set of one or more anchor candidate nodes that is coupled to a highest number of nodes in an existing graph diagram.

The method 700 may further include performing the acts of the method 700 a plurality of times with different candidate nodes selected as the anchor node to identify an anchor node that causes a least amount of overlap of new nodes over existing nodes in the existing graph diagram.

The method 700 may further include performing the acts of the method 700 a plurality of times with different candidate nodes selected as the anchor node to identify an anchor node that causes a most efficient graph layout.

Figure 8:
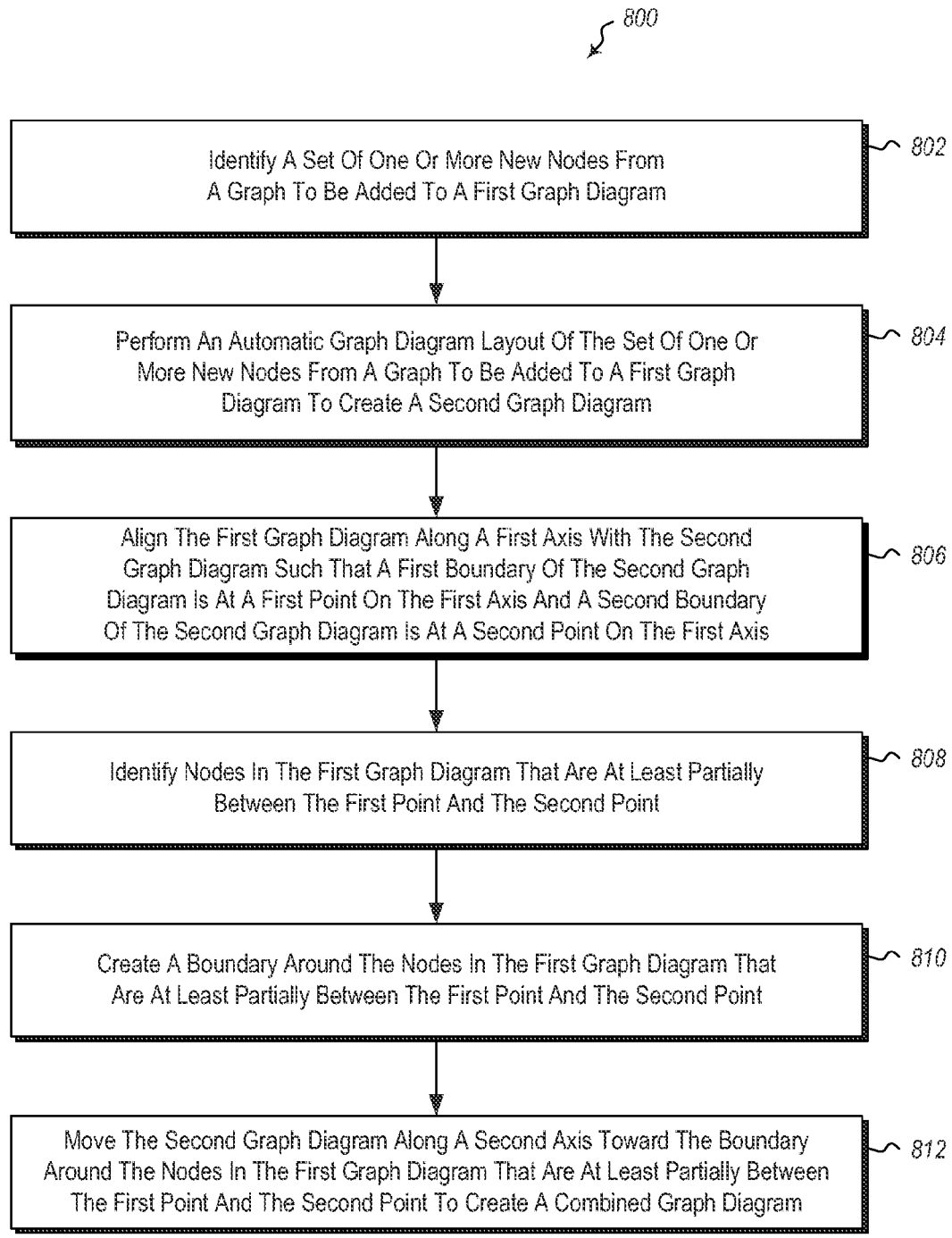
FIG. 8 illustrates a method for adding a new disjoint graph diagram to an existing graph diagram.

Referring now to FIG. 8, a method 800 of adding a new disjoint graph diagram, with new graph nodes that are not to be connected to any exiting nodes in the existing graph, to an existing graph diagram is illustrated.

The method 800 includes identifying a set of one or more new nodes from a graph to be added to a first graph diagram (act 802). For example, in the illustrations above, nodes 118-15, 11846, 118-17, 1188 and 118-19 may be identified as new nodes to be added to the graph diagram 108-A.

The method 800 further includes performing an automatic graph diagram layout of the set of one or more new nodes from a graph to be added to a first graph diagram to create a second graph diagram (act 804). For example, as illustrated above, an automatic layout tool with an automatic layout function may be used to create the subgraph diagram 116b.

The method 800 further includes aligning the first graph diagram along a first axis with the second graph diagram such that a first boundary of the second graph diagram is at a first point on the first axis and a second boundary of the second graph diagram is at a second point on the first axis (act 806). In the example illustrated in FIGS. 6A and 6B, this may be done by using bounding rectangles 603 and 602. However, in other embodiments, the boundary may be defined by the nodes themselves (e.g., nodes 118-1, 118-6, and/or 118-10 and node 118-15), such as by defining the boundary as the outer edge of a node. Other boundaries may be used alternatively or additionally.

The method 800 further includes identifying nodes in the first graph diagram that are at least partially between the first point and the second point (act 808). FIG. 6B illustrates an example of this where nodes 118-1, 118-21, 118-3, 118-4, 118-5, 118-6, 118-7, 118-8, 118-9, 118-10, 118-11, and 118-12 are identified.

The method 800 further includes creating a boundary around the nodes in the first graph diagram that are at least partially between the first point and the second point (act 810). FIG. 6B illustrates that this is performed by creating the bounding rectangle 604. However, other appropriate boundaries may be constructed as appropriate.

The method 800 further includes moving the second graph diagram along a second axis toward the boundary around the nodes in the first graph diagram that are at least partially between the first point and the second point to create a combined graph diagram (act 812). Thus, as illustrated in FIG. 6B, the subgraph diagram 116b is moved toward the boundary 604. Note that in this example, the subgraph diagram is placed proximate to the boundary 604, but does not cross into the boundary 604.

The method 800 may be practiced where the acts are performed at different alignments along the first axis and an optimization determination is performed on the combined graph diagram. For example, in FIGS. 6C and 6D example, as illustrated above, optimization determinations may be done for example, to minimize distance between nodes of the graph diagram 108-A and subgraph diagram 116b. For example, the updated graph diagram 108-1 illustrated in FIG. 6D is more efficiently laid out in terms of using less canvas space than the updated graph diagram 108-1 illustrated in FIG. 6B.

The method 800 may further include performing the acts of the method 800 with different automatic layout functions to identify a layout function that causes a most efficient graph layout. For example, different automatic layout functions may be used to create the subgraph diagram 116b. Embodiments can determine which function results in a most efficient layout diagram from among different layout diagrams created by different layout functions and select that diagram to be combined with the graph diagram 108-A The method 800 may further include identifying one or more floating nodes from the first graph diagram that are to be coupled to at least one node in the set of one or more new nodes from the graph. In this case, performing an automatic graph diagram layout is performed on the set of one or more new nodes and the floating nodes.

As illustrated in FIGS. 6A and 6B, the method 800 may further include creating a first bounding rectangle (e.g., bounding rectangle 603) around the first graph diagram and a second bounding rectangle (e.g., bounding rectangle 602) around the second graph diagram, and wherein aligning the first graph diagram along a first axis with the second graph diagram comprises aligning a side of the first bounding rectangle with a side of the second bounding rectangle.

The method 800 may be practiced where the acts are performed for a plurality of different orientations for the second graph diagram to identify an orientation from among the different orientations that results in a combined graph diagram that is more efficient than one or more combined graph diagrams for one or more other orientations in the different orientations. For example, the subgraph diagram 116b could be rotated in various orientations and then aligned in each of the orientations to create various different boundaries. This could be done to identify a most efficient combined graph using from among the various different orientations.

The method 800 may further include performing a remove overlap operation to remove any overlap of added nodes onto existing nodes in the first graph diagram.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, RDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured to utilize an anchor node to efficiently insert one or more additional nodes into a graph diagram visualization while preserving layout of existing nodes in the graph diagram visualization, the system comprising:
   one or more processors; and
   one or more computer-readable media having stored thereon computer-executable instructions representing at least a new graph creation tool, a layout tool, and a combiner tool,
   the computer-executable instructions, when executed at the one or more processors, cause the new graph creation tool to perform at least the following:
      receive a second version of a graph, which comprises:
         one or more existing nodes already existing in a first graph diagram visualization that reflects a first version of the graph, and
         one or more new nodes to be added to the first graph diagram visualization as part of creating a second graph diagram visualization that reflects the second version of the graph;
      identify, in the second version of the graph, the one or more new nodes to be added to the first graph diagram visualization;
      identify, in the second version of the graph, one or more anchor candidate nodes, from among the one or more existing nodes, that are each coupled to at least one of the one or more new nodes in the second version of the graph, wherein each anchor candidate node is coupled directly, with no intervening node, to at least one of the one or more new nodes in the second version of the graph; and
      create a new graph from the one or more new nodes to be added to the first graph diagram visualization and from the one or more anchor candidate node, the new graph excluding any of the one or more existing nodes that is not directly coupled to at least one of the one or more new nodes;
   the computer-executable instructions, when executed at the one or more processors, further cause the layout tool to automatically create a disjoint graph diagram from the new graph based at least on the new graph creation tool having created the new graph; and
   the computer-executable instructions, when executed at the one or more processors, further cause the combiner tool to automatically create the second graph diagram visualization, by performing at least the following:
      select one of the one or more anchor candidate nodes as an anchor node;
      identify a spatial offset from the anchor node to each of the one or more new nodes that is coupled to the anchor node in the disjoint graph diagram;
      add each of the one or more new nodes to the first graph diagram visualization to create the second graph diagram visualization, which includes the one or more new nodes, while maintaining the identified spatial offset for the one or more new nodes to the anchor node in the second graph diagram visualization; and
      convey the second graph diagram visualization for display at a display device.

2. The system of claim 1, the computer-executable instructions also representing a remove overlap tool that removes any overlap of added nodes onto existing nodes in the first graph diagram visualization.

3. The system of claim 1, the computer-executable instructions also representing a plurality of different layout tools coupled to the new graph creation tool, and wherein the combiner tool identifies which layout tool causes the least amount of overlap of new nodes over existing nodes in the first graph diagram visualization.

4. The system of claim 1, the computer-executable instructions also representing a plurality of different layout tools coupled to the new graph creation tool, and wherein the combiner tool identifies which layout tool that causes a most efficient graph layout.

5. The system of claim 1, wherein the combiner tool selects one of the nodes in the one or more anchor candidate nodes as an anchor node by selecting a node from the one or more anchor candidate nodes that is coupled to a highest number of new nodes in the second version of the graph.

6. The system of claim 1, wherein the combiner tool selects different candidate nodes as the anchor node to identify an anchor node that causes a least amount of overlap of new nodes over existing nodes in the first graph diagram visualization.

7. The system of claim 1, wherein the combiner tool is selects different candidate nodes as the anchor node to identify an anchor node that causes a most efficient graph layout.

8. A method implemented at a computer system that includes one or more processors, for utilizing an anchor node to efficiently insert one or more additional nodes into a graph diagram visualization while preserving layout of existing nodes in the graph diagram visualization, the method comprising:
   at the one or more processors, conveying a first graph diagram visualization for display at a display device, the first graph diagram visualization reflecting a first version of a graph;
   at the one or more processors, identifying one or more new nodes from a second version of the graph to be added to the first graph diagram visualization to create a second graph diagram visualization reflecting the second version of the graph;
   at the one or more processors, identifying one or more anchor candidate nodes in the second version of the graph that are each coupled to at least one of the one or more new nodes in the second version of the graph, wherein each of the anchor candidate nodes is coupled directly, with no intervening nodes, to at least one of the one or more new nodes in the second version of the graph, or a previously floating node in the first version of the graph;
   at the one or more processors, selecting one of the one or more anchor candidate nodes as an anchor node;
   at the one or more processors, performing an automatic graph diagram layout of the anchor node and the one or more new nodes that are to be coupled to the anchor node, to create a disjoint graph diagram;
   at the one or more processors, identifying a spatial offset from the anchor node to each of the one or more new nodes coupled to the anchor node in the disjoint graph diagram;
   at the one or more processors, adding each of the one or more new nodes to the first graph diagram visualization, while maintaining the identified spatial offsets, to create the second graph diagram visualization; and
   at the one or more processors, conveying the second graph diagram visualization for display at the display device.

9. The method of claim 8, further comprising performing a remove overlap operation to remove any overlap of added nodes onto existing nodes in the first graph diagram visualization.

10. The method of claim 8, further comprising identifying a layout function, from among a plurality of available layout functions, that causes the least amount of overlap of new nodes over existing nodes in the first graph diagram visualization.

11. The method of claim 8, further comprising identifying a layout function, from among a plurality of available layout functions, that causes a most efficient graph layout.

12. The method of claim 8, wherein selecting one of the one or more anchor candidate nodes as an anchor node comprises selecting a node from the one or more anchor candidate nodes that is coupled to a highest number of nodes in the first graph diagram visualization.

13. The method of claim 8, further comprising using different candidate nodes selected as the anchor node to identify an anchor node that causes a least amount of overlap of new nodes over existing nodes in the first graph diagram visualization.

14. The method of claim 8, further comprising using different candidate nodes selected as the anchor node to identify an anchor node that causes a most efficient graph layout.

15. A system for utilizing an anchor node to efficiently insert one or more additional nodes into a graph diagram visualization while preserving layout of existing nodes in the graph diagram visualization, the system comprising:
one or more processors; and
one or more computer-readable media, wherein the one or more computer-readable media comprise computer-executable instructions that when executed by at least one of the one or more processors cause the system to perform the following:
convey, by the one or more processors, a first graph diagram visualization for display at a display device, the first graph diagram visualization reflecting a first version of a graph;
identify, at the one or more processors, one or more new nodes from a second graph to be added to the first graph diagram visualization to create a second graph diagram visualization reflecting the second version of the graph;
identify, at the one or more processors, one or more anchor candidate nodes in the second version of the graph that are each coupled to at least one of the one or more new nodes in the second version of the graph, wherein each of the anchor candidate nodes is coupled directly, with no intervening nodes, to at least one of the one or more new nodes in the second version of the graph, or a previously floating node in the first version of the graph;
select, at the one or more processors, one of the one or more anchor candidate nodes as an anchor node;
at the one or more processors, perform an automatic graph diagram layout of the anchor node and the one or more new nodes that are to be coupled to the anchor node, to create a disjoint graph diagram;
at the one or more processors, identify a spatial offset from the anchor node to each of the one or more new nodes coupled to the anchor node in the disjoint graph diagram;
at the one or more processors, add each of the one or more new nodes to the first graph diagram visualization, while maintaining the identified spatial offsets, to create the second graph diagram visualization; and
convey, by the one or more processors, the second graph diagram visualization for display at the display device.

16. The system of claim 15, wherein the one or more computer-readable media comprise computer-executable instructions that when executed by at least one of the one or more processors cause the system to perform a remove overlap operation to remove any overlap of added nodes onto existing nodes in the first graph diagram visualization.

17. The system of claim 15, wherein the one or more computer-readable media comprise computer-executable instructions that when executed by at least one of the one or more processors cause the system to use different automatic layout functions to identify a layout function that causes the least amount of overlap of new nodes over existing nodes in the first graph diagram visualization.

18. The system of claim 15, wherein the one or more computer-readable media comprise computer-executable instructions that when executed by at least one of the one or more processors cause the system to use different automatic layout functions to identify a layout function that causes a most efficient graph layout.

19. The system of claim 15, wherein selecting one of the nodes in the one or more anchor candidate nodes as an anchor node comprises selecting a node from the one or more anchor candidate nodes that is coupled to a highest number of nodes in the first graph diagram visualization.

20. The system of claim 15, wherein the one or more computer-readable media comprise computer-executable instructions that when executed by at least one of the one or more processors cause the system to use different candidate nodes selected as the anchor node to identify an anchor node that causes a least amount of overlap of new nodes over existing nodes in the first graph diagram visualization.

* * * * *